(12) United States Patent
Murphy

(10) Patent No.: US 6,662,772 B1
(45) Date of Patent: Dec. 16, 2003

(54) INTEGRATED SWIRL CONTROL VALVE

(75) Inventor: Kevin Arthur Murphy, Sterling Heights, MI (US)

(73) Assignee: Siemens Canada Limited, Tilbury (CA)

(*) Notice: Subject to any disclaimer, the term of this patent is extended or adjusted under 35 U.S.C. 154(b) by 19 days.

(21) Appl. No.: 09/710,420

(22) Filed: Nov. 10, 2000

Related U.S. Application Data
(60) Provisional application No. 60/165,155, filed on Nov. 12, 1999.

(51) Int. Cl.[7] ............................................. F02M 35/10
(52) U.S. Cl. ................................... 123/184.21
(58) Field of Search ............................ 123/184.21, 586

(56) References Cited

U.S. PATENT DOCUMENTS

| | | | |
|---|---|---|---|
| 4,408,581 A | * 10/1983 | Pfalzgraf et al. | ............ 123/586 |
| 5,531,194 A | * 7/1996 | Komatsu et al. | ....... 123/184.21 |
| 5,696,318 A | 12/1997 | Ernst et al. | |
| 5,909,728 A | * 6/1999 | Yoshioka et al. | ............ 123/586 |
| 5,924,398 A | * 7/1999 | Choi | ........................... 123/590 |
| 5,979,401 A | 11/1999 | Hickey | |

FOREIGN PATENT DOCUMENTS

| | | |
|---|---|---|
| DE | 44 45 777 A | 6/1995 |
| EP | 0 711 906 A | 5/1996 |
| WO | WO 99/10658 | 3/1999 |

* cited by examiner

Primary Examiner—Noah P. Kamen
Assistant Examiner—Jason Benton

(57) ABSTRACT

The subject invention is an intake manifold with a swirl control valve assembly mounted to an internal combustion engine. The intake manifold assembly includes a plurality of air intake passages through which air flows to the combustion chambers of the engine. The air flow control valve assembly is mounted within the intake manifold between the intake manifold and the engine. The air flow control valve assembly includes a plurality of valve plates to direct air flowing through the air intake passages. The valve plates are disposed within the air intake passages and are mounted to a common shaft for rotation about an axis. The valve plates rotate between an open position and a closed position. Each of the valve plates has an opening that allows the flow of air through the air intake valve when the valve plate is in the closed position. The opening is configured in such a manner to direct the flow of are through the air intake passage. The size and position of the opening in each of the valve plates is arranged and configured to create a predetermined flow of the air into the combustion chamber to promote efficient combustion of the air fuel.

20 Claims, 2 Drawing Sheets

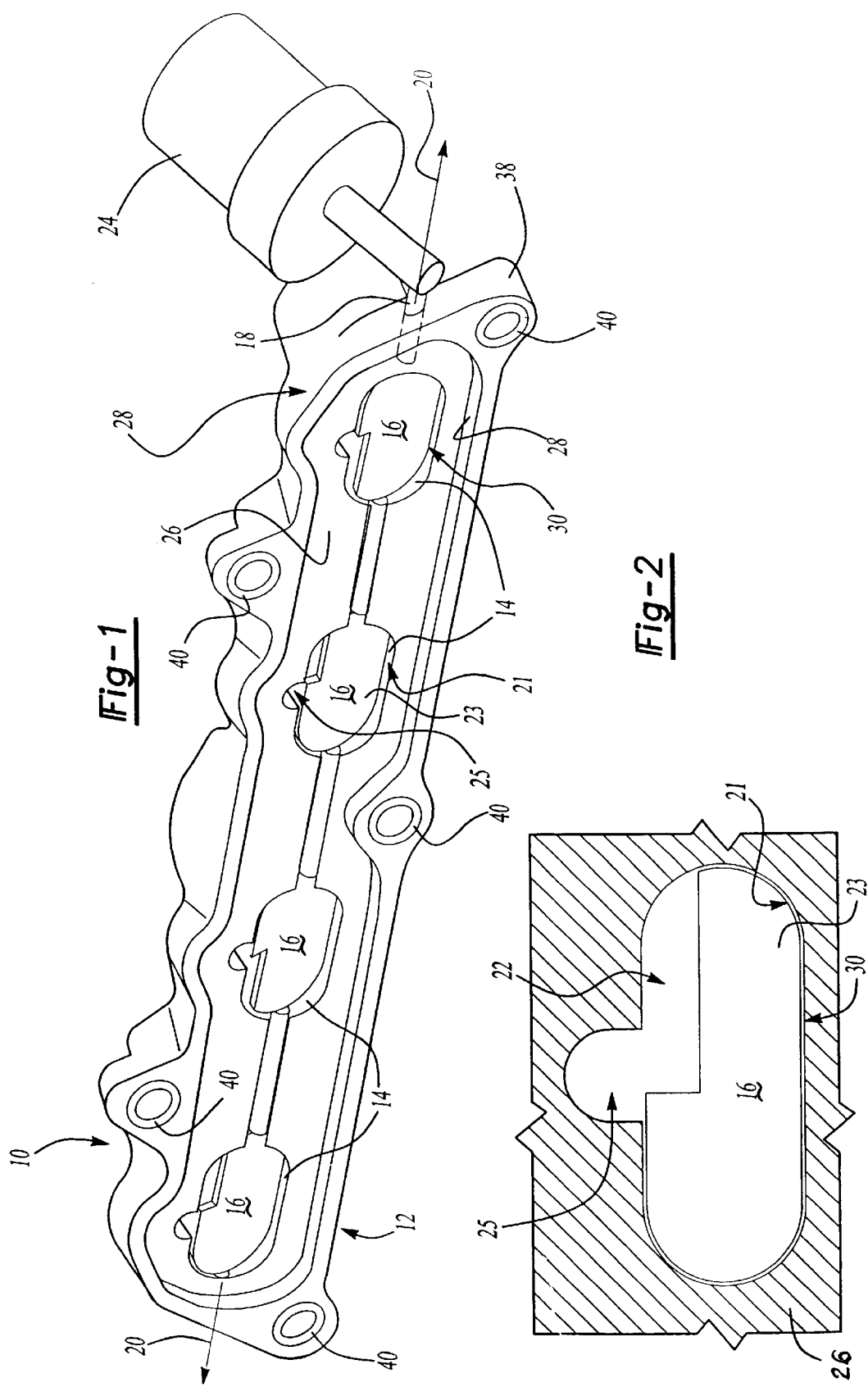

INTEGRATED SWIRL CONTROL VALVE

This application claims priority to provisional application Ser. No. 60/165,155 filed on Nov. 12, 1999.

BACKGROUND OF THE INVENTION

This application discloses an air intake manifold with an air flow control valve assembly.

Typically, air enters an intake manifold through a throttle body. Typically, the throttle body includes one throttle valve that regulates the intake of air into the intake manifold. Once air is in the intake manifold, the air flows through a plurality of air passages or runners. Only the shapes of internal surfaces of the intake manifold control air flowing through the air passages. Typically, air mixes with fuel and is injected into a combustion chamber of the engine. The specific way in which air flows through an intake manifold and into the combustion chamber directly affects how efficient the engine will run. For these reasons the interior surfaces of the intake manifold are designed to promote efficient airflow through the intake manifold and to each individual cylinder. However, differing engine operating conditions may require different airflow characteristics, so a balance of air flow requirements for each engine speed is made, thereby, sacrificing optimal performance at all engine operating conditions.

Further, emission standards for vehicles are becoming increasingly demanding. One of the more demanding of the emission standards pertains to the initial start up of the engine in a cold environment. The engine upon initial start up and idle conditions typically exhibits the most inefficient and incomplete combustion of the air fuel mixture. Incomplete combustion of the air fuel mixture increases the amount of measurable emissions from a vehicle.

For these reasons it is desirable and necessary to provide a device that can direct and condition the flow of air through an intake manifold and into the combustion chamber to account for variable engine operations settings and to promote efficient combustion of the air fuel mixture at low engine operating conditions.

SUMMARY OF THE INVENTION

The subject invention is an intake manifold assembly with an integral air flow control valve assembly.

The intake manifold assembly includes a plurality of air intake passages through which air flows to combustion chambers of the engine. The air flow control valve assembly is mounted within the intake manifold between the intake manifold and the engine. The air flow control valve assembly includes a plurality of valve plates to direct air flowing through each of the air intake passages. The valve plates are disposed within the air intake passages and are mounted to a common shaft for rotation about an axis. An actuator controlled by an engine electronic control unit rotates the shaft and the valve plates rotate between an open position and a closed position. Each of the valve plates includes an opening that allows the flow of air through the air intake valve when the valve plate is in the closed position. The opening is configured in such a manner to direct the flow of air through the air intake passage. The directed air flow promotes efficient combustion of the air fuel mixture at low engine speeds. Further, the valve plates are rotated to the open position at higher engine speeds that require different air flow direction.

The subject invention overcomes the problems of prior art intake manifolds and promotes efficient combustion by providing a plurality of valve plates within the intake manifold to direct the flow of air into each combustion chamber. Further, the subject invention provides for the variable positioning of the valve plates to accommodate the air directing and conditioning requirements at various engine operating conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a perspective view of an intake manifold with an integral control valve;

FIG. 2 is an exploded view of the intake manifold and integral flow control valve.

DETAILED DESCRIPTION OF THE PREFERRED EMBODIMENT

Figure 3:
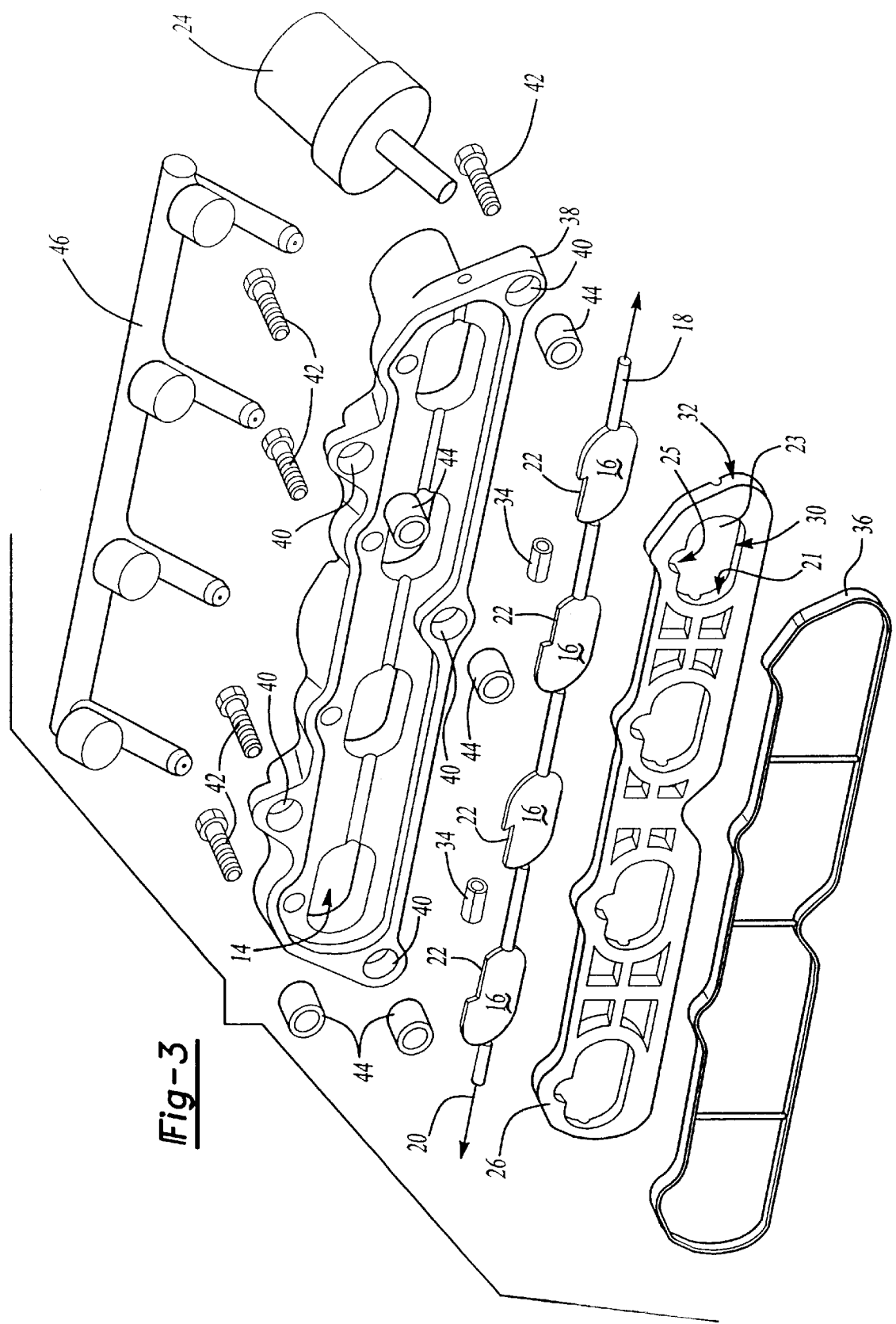
FIG. 3 is cutaway view of a valve plate disposed in the intake manifold.

Referring to the Figures, wherein like numerals indicate like or corresponding parts throughout the several views, the subject invention is an intake manifold assembly 10 with and air flow control valve assembly 12 mounted to an internal combustion engine. Referring to FIG. 1, the intake manifold assembly 10 includes a plurality of air intake passages 14 through which air flows to combustion chambers of the engine. The air flow control valve assembly 12 is mounted within the intake manifold assembly 10 and between the intake manifold 10 and the engine. The air flow control valve assembly 12 includes a plurality of valve plates 16 to direct air flowing through the air intake passages 14. The valve plates 16 are disposed within the air intake passages 14 and are mounted to a common shaft 18 for rotation about an axis 20. The valve plates 16 rotate between an open position and a closed position.

Referring to FIG. 2, each of the valve plates 16 has an opening 22 that allows the flow of air through the air intake passages 14 when the valve plates 16 are in the closed position. The opening 22 is configured in such a manner to direct the flow of air through the air intake passage 14. Specifically, the size and position of the opening 22 in each of the valve plates 16 is arranged and configured to create a predetermined flow of the air into the combustion chamber. The predetermined flow promotes efficient combustion of the air fuel mixture at low engine speeds. The preferred embodiment of the subject invention includes an approximately rectangular opening disposed at in the valve plate to create the proper airflow required for each combustion chamber.

The valve plate 16 cooperates with an opening 30 in a retainer plate 26 to shape airflow through the intake manifold 10. The opening 30 comprises a contour 21 having first and second areas 23, 25. The first area 23 is larger than the second area 25 and is selectively blocked by the valve plate 16. The second area 25 is open at all times regardless of the position of the valve plate 16.

Referring to FIG. 3, the valve plates are fixed to the shaft and rotate between an open and closed position. The openings 22 are disposed relative to each individual air intake passage 14. Specifically, as shown the openings 22 are generally rectangular shaped and disposed an upper corner of each valve plate 16. The shape of the opening is intended to create an airflow that promotes efficient combustion in the combustion chamber and is not limited to rectangular shape of the subject invention. One knowledgeable in the art will recognize that the opening 22 may be of any shape or position on the valve plate 16 that promotes the efficient combustion of the fuel air mixture.

The shaft 18 is driven for rotation about the axis 20 by an actuator 24. An engine electronic control unit (not shown) controls the actuator 24 to rotate the shaft 18 and thereby open the valve plates 16 as required for the desired engine operating condition.

The shaft 18 is held in place for rotation about the axis 20 by a retainer plate 26. The retainer plate 26 and shaft 18 fit into a recess 28 in the intake manifold 10. Openings 30 in the retainer plate 26 conforms to the contours of the air intake passages 14 of the intake manifold 10 and assist in directing air flow through the intake manifold 10 and into the combustion chamber. In the preferred embodiment, a periphery 32 of the retainer plate 26 is the same shape as the intake manifold 10. Specifically, the retainer plate 26 is shaped to fit into the recess 28 fabricated into the intake manifold assembly 10. The shaft 18 is secured for rotation about the axis 20 between the retainer plate 26 and the intake manifold 10. Bearings 34 provide for the mounting and rotation of the shaft 18 trapped between the retainer plate 26 and the intake manifold 10. A seal 36 is disposed between the intake manifold 10 and the engine. The seal 36 ensures that air flow through each of the individual air intake passages 14 is not mixed with air flow from any of the other air intake passages 14. The seal 36 also prevents air flow from escaping to atmosphere from any of the air intake passages 14.

The retainer 26 includes the opening 30 that includes a contoured shape 21 for aiding in the shape of airflow through the intake manifold assembly 10. The contoured shape 21 includes the first area 23 and the second area 25. Airflow through the first area 23 is controlled by the valve plate 16. Airflow through the second area 25 remains unobstructed to provide continuous airflow through the intake manifold assembly regardless of the position of the valve plate 16. The opening 22 of the valve plate 16 cooperates with the second area 25 to shape and direct airflow.

The air intake manifold includes a flange 38 with having a plurality of flange openings 40 for fasteners 42 used to attach the intake manifold 10 to the engine. In the preferred embodiment the intake manifold 10 is fabricated from a plastic material. Inserts 44 are disposed within each of the flange openings 40 to prevent the fasteners 42 from being over tightened to cause damage to the intake manifold 10.

In the preferred embodiment shown in FIG. 3, a fuel rail 46 is attached to the intake manifold 10 to provide fuel to each of the combustion chambers. The fuel rail is just one example of how fuel may be introduced into the intake manifold 10. It is understood that any device known those knowledgeable in the art may be used with the subject invention to introduce fuel into the combustion chamber.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An intake manifold assembly mounted to an internal combustion engine comprising;
    a plurality of air intake passages;
    a valve plate disposed in each of said air intake passages for directing airflow through said intake passages;
    a retainer plate attached to said intake manifold to shape airflow into the engine, said retainer plate including an opening with first and second areas, airflow through said first area controlled by said valve plate, and airflow through said second area open to airflow through said intake passages independent of said valve plate;
    a shaft fixed to rotate said valve plates between an open and closed position;
    said valve plates disposed within said retainer plate and having an opening such that in said closed position said opening directs the flow of air through said intake passage.

2. The assembly of claim 1, wherein said opening of said valve plate is shaped to preferentially direct airflow into said engine.

3. The assembly of claim 1, where said retainer plate defines the contour of said air intake passages.

4. The assembly of claim 1, further including an actuator fixed to rotate said shaft.

5. The assembly as in claim 1, further including a seal attached to said retainer plate to isolate air intake through each of said air intake passages.

6. The assembly of claim 1, further including a bearing attached to support said shaft in said intake manifold.

7. The assembly of claim 1, wherein said intake manifold is fabricated from plastic and includes an attachment flange and said attachment flange includes a plurality of openings.

8. The assembly of claim 5, further including a plurality of inserts disposed within said opening of said attachment flange and a plurality of fasteners extending through said inserts to secure said intake manifold to the engine.

9. An swirl control valve assembly for an intake manifold mounted to an internal combustion engine comprising;
    a plurality of air intake passages;
    a plurality of valve plates disposed within each of said air intake passages to direct airflow through said intake passages;
    a shaft fixed to rotate said valve plates between an open and closed position;
    a retainer plate to shape airflow through said air intake passages and to secure said shaft to said intake manifold, said retainer plate including an opening with first and second areas, airflow through said first area controlled by said valve plate, and airflow through said second area open to airflow through said intake passages independent of said valve plate; and
    said valve plates having an opening such that in said closed position said opening directs the flow of air through said air intake passage.

10. The assembly of claim 9, further including a flange, said flange having a recess to receive said retainer and said valve plates.

11. The assembly of claim 9, further including a seal disposed between said intake manifold and the engine, said seal isolates air flow through said air intake passages from each other.

12. The assembly of claim 9, wherein said intake manifold is fabricated from plastic.

13. The assembly of claim 12, further including an attachment flange having a plurality of openings, an insert within each of said openings, and a fastener extending through each of said openings to secure said intake manifold to the engine.

14. The assembly of claim 1, wherein said shaft is secured between said retainer plate and intake manifold.

15. The assembly of claim 1, wherein said second area is adjacent said opening of said valve plate when in a closed position blocking at least some airflow through said first area of said contour.

16. The assembly of claim 1, wherein said second area is smaller than said first area.

17. The assembly of claim 1, wherein said second area cooperates with said opening of said valve plate to direct airflow through said intake passage.

18. The assembly of claim 9, wherein said second area is adjacent said opening of said valve when said valve plate is in a closed position blocking at least some airflow through said first area.

19. The assembly of claim 9, wherein said second area is smaller than said first area.

20. The assembly of claim 9, wherein said second area cooperates with said opening of said valve plate to direct airflow through said intake passage.

* * * * *